(12) United States Patent
Endo et al.

(10) Patent No.: US 7,447,500 B2
(45) Date of Patent: *Nov. 4, 2008

(54) MOBILE COMMUNICATION TERMINAL TEST SYSTEM CAPABLE OF VISUALLY RECOGNIZING COMMUNICATION CONDITION AND RESPONSE SIGNAL

(75) Inventors: Takaharu Endo, Atsugi (JP); Makoto Onuki, Kanagawa-ken (JP)

(73) Assignee: Anritsu Corporation, Atsugi-shi (JP)

( * ) Notice: Subject to any disclaimer, the term of this patent is extended or adjusted under 35 U.S.C. 154(b) by 534 days.

This patent is subject to a terminal disclaimer.

(21) Appl. No.: 10/538,721
(22) PCT Filed: Oct. 20, 2004
(86) PCT No.: PCT/JP2004/015518
§ 371 (c)(1),
(2), (4) Date: Jun. 13, 2005
(87) PCT Pub. No.: WO2005/039222
PCT Pub. Date: Apr. 28, 2005

(65) Prior Publication Data
US 2006/0094416 A1    May 4, 2006

(30) Foreign Application Priority Data
Oct. 21, 2003    (JP)    ............................. 2003-360384

(51) Int. Cl.
*H04Q 7/20*    (2006.01)
*H04B 17/00*    (2006.01)
(52) U.S. Cl. .................................. 455/423; 455/67.11
(58) Field of Classification Search ......... 455/423–425, 455/67.11; 375/228
See application file for complete search history.

(56) References Cited
U.S. PATENT DOCUMENTS
5,825,817 A * 10/1998 Tanaka et al. ................ 375/228
(Continued)

FOREIGN PATENT DOCUMENTS
JP    2001-45561 A    2/2001
(Continued)

OTHER PUBLICATIONS
Notification Concerning Transmittal of Copy of International Preliminary Report on Patentability, Chapter I of the Patent Cooperation Treaty, and Written Opinion of the International Searching Authority, for PCT/JP2004/019408, 5 sheets.
(Continued)

*Primary Examiner*—George Eng
*Assistant Examiner*—Michael Faragalla
(74) *Attorney, Agent, or Firm*—Frishauf, Holtz, Goodman & Chick, P.C.

(57)    ABSTRACT

A control unit outputs control information including time setting information for a transition test of a connection state of a mobile communication terminal of a cellular system. In accordance with the control information, a transmission/reception unit generates a plurality of test signals including predetermined messages to a plurality of cells, and varies them in accordance with a scheduled time passage to transmit them to the terminal and receive response signals including predetermined messages from the terminal. A measurement unit measures time domain waveforms of the response signals, and an acquiring unit acquires and stores messages and radio-communication time information when the messages are exchanged. A display unit displays graphs indicating measured results of the waveforms and a predetermined number of radio-communication markers indicating points in radio-communication time corresponding to the time information by a graphic display capable of simultaneously comparing at both sides of the same comparing time base.

18 Claims, 4 Drawing Sheets

U.S. PATENT DOCUMENTS

| | | | |
|---|---|---|---|
| 7,058,796 B2 * | 6/2006 | Lynn et al. ................ | 713/1 |
| 2004/0059546 A1 | 3/2004 | Morikawa et al. | |

FOREIGN PATENT DOCUMENTS

| | | |
|---|---|---|
| JP | 2002-217866 A | 8/2002 |
| JP | 2003-101488 A | 4/2003 |
| WO | WO 03/013035 A1 | 2/2003 |

OTHER PUBLICATIONS

3$^{RD}$ Generation Partnership Project; Technical Specification Group Terminals; Terminal Conformance Specification; Radio Transmission and Reception (FDD) Release 5; Jun. 2004; pp. 2-63.

Notification Concerning Transmittal of Copy of International Preliminary Report on Patentability, Chapter I of the Patent Cooperation Treaty for PCT/JP2004/015518, 5 sheets.

* cited by examiner

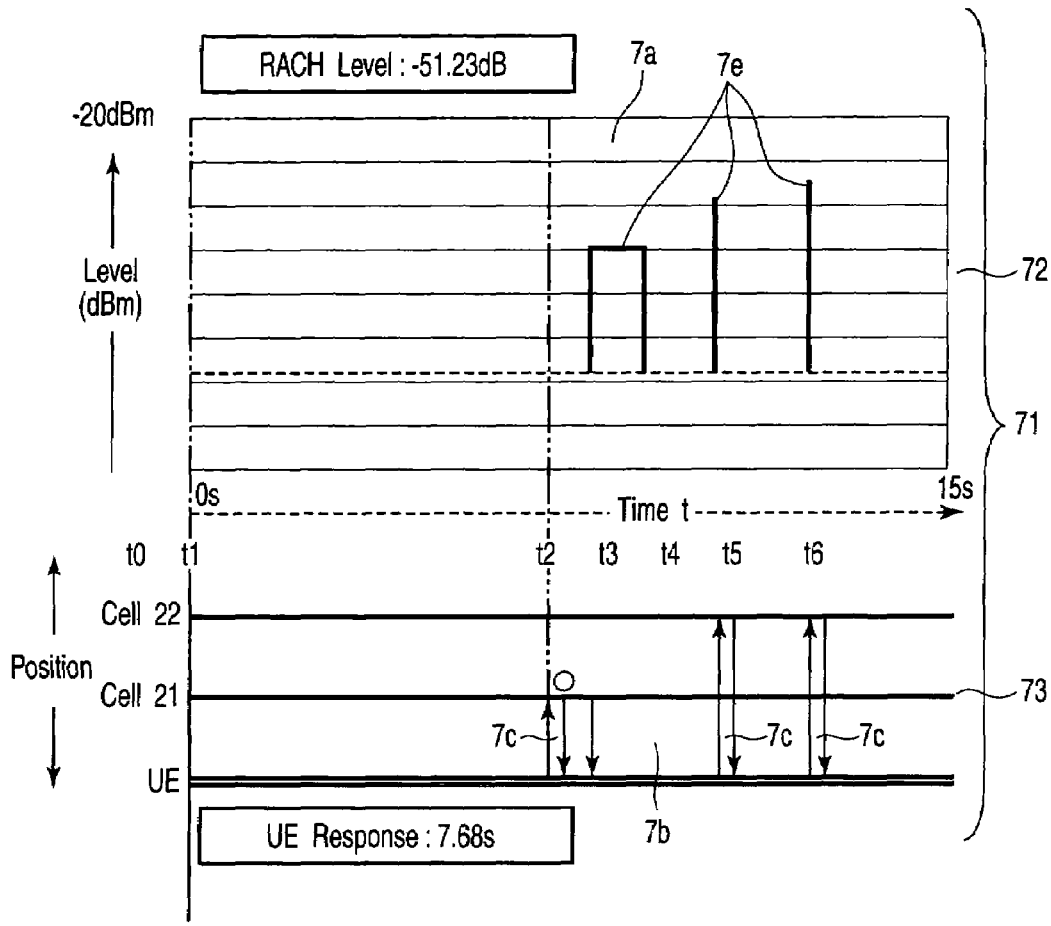
F I G. 2 A
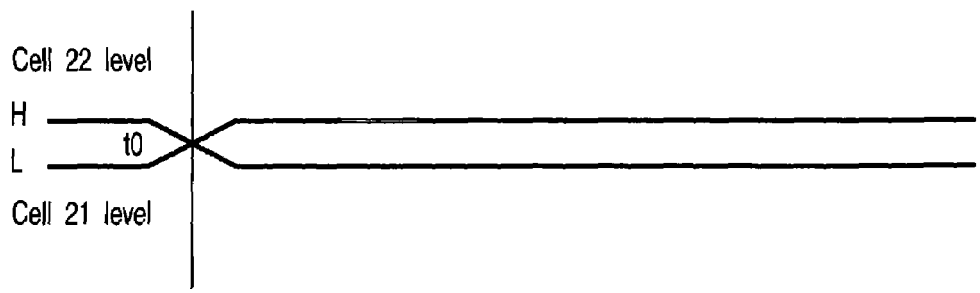
F I G. 2 B

US 7,447,500 B2

MOBILE COMMUNICATION TERMINAL TEST SYSTEM CAPABLE OF VISUALLY RECOGNIZING COMMUNICATION CONDITION AND RESPONSE SIGNAL

This application is a U.S. National Phase Application under 35 USC 371 of International Application PCT/JP2004/015518 filed Oct. 20, 2004.

TECHNICAL FIELD

The present invention relates to a test system for a mobile communication terminal having a system simulator function capable of communication connection with a mobile communication terminal, the test system testing, by means of a mobile communication terminal of a cellular system which moves among cells (units of service areas of respective base stations), whether or not the connection state of the mobile communication terminal appropriately transits between the cells so as to correspond to a movement of the mobile communication terminal between the cells. In particular, the invention relates to a test system for a mobile communication terminal using a technology in which an operator can visually recognize the radio-communication state in a connection transition test for switching a mobile communication terminal which is a test object to being in a receiving state by being made to simulate a transition between cells, and a response signal from the mobile communication terminal.

BACKGROUND ART

Conventionally, for example, a cellular system has been known as one of communication systems using a mobile communication terminal such as a car cellular phone or a mobile cellular phone.

FIG. 4 is a diagram for explaining a relationship among cells (service areas) and base stations in such a cellular system.

Namely, as shown in FIG. 4, for example, in a communication system using a mobile communication terminal such as a car cellular phone or a mobile cellular phone, a position of the mobile communication terminal 1 is registered as a cellular system in the corresponding to base stations 11, 12, 13, 14, . . . when the mobile communication terminal comes into one of cells 21, 22, 23, 24, . . . which are service areas called cells, respectively, so that respective base stations 11, 12, 13, 14, . . . enable the mobile communication terminal 1 to carry out communication with a desired opposite party.

For example, as shown by broken line arrow A in FIG. 4, when the mobile communication terminal moves from the cell 21 to the cell 22, communication services can be received from the double base stations 11 and 12 of the cell 21 and the cell 22. In this case, the mobile communication terminal can use an incoming radio wave whose power is stronger from the cell 21 or the cell 22 of one of the base station 11 and the base station 12, or incoming radio waves from the both of the cell 21 and the cell 22.

In this case, when the mobile communication terminal moves from the cell 21 to the cell 22 as shown by the above-described arrow A, the mobile communication terminal automatically switches the connection state from the base station 11 to the base station 12 (hereinafter, called "a transition of the connection state").

Accordingly, at a manufacturer of mobile communication terminals, it is necessary to execute a connection transition test for testing whether or not a transition of the connection state is correctly executed in the mobile communication terminal, in advance, before shipping the mobile communication terminal.

In such a connection transition test, a method is used in which the position thereof is fixed without moving the mobile communication terminal itself, a plurality of test signals corresponding to the cells 21, 22, 23, 24, . . . are successively generated at the test system side, and simulated communication with the mobile communication terminal is made by means of a protocol in accordance with the communication system, thereby testing a transition of the connection state of the mobile communication terminal.

Namely, a system simulator is configured on the test system side, and the system simulator makes communication with the mobile communication terminal, thereby carrying out a connection transition test with respect to the mobile communication terminal.

As a method for testing a mobile communication terminal in such a communication system, for example, there is a radio resource management (RRM) test in accordance with the regulations described in non-Patent document 1 (3GPP TS 34. 121, V5. 4. 0, June 2004, 3GPP Organizational Partners [ARIB, ATIS, CCSA, ETSI, TTA, TTC], France, Contents No. 34-148, 184-212 [pp1-63]). To put it simply, this RRM test is to carry out a connection test with a base station or a procedure test with respect to a mobile communication terminal.

RRM tests include a test relating to a detecting time of a random access channel (RACH).

Note that as a RACH receiver for receiving a preamble part and a message part on the RACH, or the like, a receiver disclosed in Patent document 1 (Jpn. Pat. Appln. KOKAI Publication No. 2002-217866) has been known. Then, the above-described test relating to a detecting time of a RACH is, in short, carried out as follows.

Namely, in FIG. 4, when the mobile communication terminal transmits a request (preamble part) to the base station 12 in order for the mobile communication terminal to make a transition of the receiving state from a state of receiving the cell 21 to the cell 22, the base station 12 responds to this request while raising transmitting power in the cell 22.

Then, the base station 12 transmits a response signal, and thereafter, waits for a response (message part) from the mobile communication terminal at a predetermined timing.

Accordingly, the above test relating to a detecting time of a RACH is carried out by examining whether or not a time in which the response (message part) from the mobile communication terminal is detected at a predetermined timing is within a predetermined detecting time.

FIG. 5 is a functional block diagram showing a configuration of a conventional test system for carrying out the RRM test and the test relating to a detecting time of a RACH therein.

In FIG. 5, a transmission/reception unit 3 has functions of respective transmitters/receivers 3a, 3b, 3c, 3d, . . . which correspond to the cells 21, 22, 23, 24, . . . in FIG. 4.

Further, the functions of the respective transmitters/receivers 3a, 3b, 3c, 3d, . . . naturally include a function of making communication connection by exchanging messages necessary for a predetermined protocol with a mobile communication terminal (user equipment [UE]) 1 in the same way as in the base stations 11, 12, 13, 14, . . . in FIG. 4.

The transmission/reception unit 3 transmits predetermined test signals to the mobile communication terminal (UE) 1 via a connection unit 2 by the functions of the respective transmitters/receivers 3a, 3b, 3c, 3d, . . . , and receives a response signal transmitted from the mobile communication terminal (UE) 1.

The reception measurement unit 4 has a function of carrying out a test for confirming a transition of the connection state of the mobile communication terminal (UE) 1 by analyzing and measuring a response signal transmitted from the mobile communication terminal (UE) 1 due to the communication connection between the transmission/reception unit 3 and the mobile communication terminal (UE) 1.

Note that the transmission/reception unit 3 and the reception measurement unit 4 are configured to operate synchronously.

Further, the reception measurement unit 4 has a function of time measurement or the like.

Then, because the mobile communication terminal (UE) 1 carries out transmission and reception by a radio propagation signal with the transmission/reception unit 3, the reception measurement unit 4 is configured so as to have incorporated therein a spectrum analyzer or the like which can measure the spectrum, the band, power, and the like thereof in order to test the characteristic of the propagation signal at a radio frequency domain.

The time measurement at the reception measurement unit 4 is carried out by receiving a response signal from the mobile communication terminal (UE) 1 in response to the test signal from the transmission/reception unit 3 at the reception measurement unit 4, and by detecting the reception time and measuring the time.

For example, the reception measurement unit 4 converts a frequency of a received signal from the mobile communication terminal (UE) 1 with respect to a test signal from the transmission/reception unit 3, into an intermediate frequency by the built-in spectrum analyzer, and sweeps time at the intermediate frequency. In this manner, the reception measurement unit 4 carries out measurement due to a time domain in the same way as an oscilloscope, thereby measuring time.

As described above, the transmission/reception unit 3 and the reception measurement unit 4 have both of the system simulator function and the measurement function (test function).

In the following description, the transmission/reception unit 3 and the reception measurement unit 4 may be collectively called a system simulator in some cases.

Note that the connection unit 2 may connect the mobile communication terminal (UE) 1 and the system simulator (the transmission/reception unit 3 and the reception measurement unit 4) interactively with a cable, or may connect them via an antenna.

A test procedure control unit 5 has a time setting unit 5a, and controls the system simulator (the transmission/reception unit 3 and the reception measurement unit 4) by outputting control information including time setting information in accordance with the regulation of the connection test in the above-described communication system, for example, a procedure by which the RRM test of W-CDMA and the test relating to a detecting time of a RACH therein as described above are carried out.

In particular, in the communication system as described above, there is regulated in the regulation described above that, when the mobile communication terminal (UE) 1 moves among the cells 21, 22, 23, 24, . . . , the mobile communication terminal (UE) 1 makes a transition so as to receive with a predetermined quality by completing reception switching and registration within a predetermined time passage. Therefore, the mobile communication terminal (UE) 1 must satisfy these sequential operations.

Accordingly, the test procedure control unit 5 has a predetermined test procedure for testing whether or not the sequential operations in accordance with the regulation as described above are satisfied with respect to the mobile communication terminal (UE) 1 via the system simulator (the transmission/reception unit 3 and the reception measurement unit 4).

When the system simulator (the transmission/reception unit 3 and the reception measurement unit 4) is operating as set at the time setting unit 5a of the test procedure control unit 5, a determining unit 6 determines whether or not the transition of the connection state among the cells 21, 22, 23, 24, and . . . , in the mobile communication terminal (UE) 1 is carried out within a predetermined time.

This determining unit 6 appropriately processes and determines the result of the above-described determination, and outputs the final test result as numeric data to a display unit 7 or the like.

In the test system for the mobile communication terminal according to the prior art, a display on the display unit 7 depends on the numeric display by only numeric data in accordance with each measurement item.

Then, in the prior art, the display on the display unit 7 is carried out so as to individually display numeric data of time measurement in accordance with each measurement item, determined results, or time waveform display.

Accordingly, in the prior art, there is the problem that, when the mobile communication terminal (UE) 1 responds abnormally at a time different from a normal time, or when there is abnormality in numeric data, it is hard for an operator to grasp a timing relationship between exchanging messages and signal waveforms between the mobile communication terminal (UE) (1) and the transmission/reception unit 3 so as to be visually recognizable.

DISCLOSURE OF INVENTION

An object of the present invention is to provide a test system for a mobile communication terminal in which, in a connection transition test by a system simulator of a mobile communication terminal, a response state of a message and a signal waveform at the time of the test are capable of simultaneously comparing with both sides of the same time base while being displayed in a graphic display, so that an operator can grasp those so as to be visually recognizable.

In order to achieve the above object, according to a first aspect of the present invention, there is provided a test system for a mobile communication terminal, comprising:

a test procedure control unit (5) which possesses a procedure for carrying out a transition test for a connection state of a mobile communication terminal (UE 1) of a cellular system, and which outputs control information including time setting information in accordance with the procedure;

a transmission/reception unit (3) which, in accordance with the control information from the test procedure control unit, generates a plurality of test signals including predetermined messages corresponding to a plurality of cells (21, 22, 23, 24, . . . ) in the cellular system, and which varies the plurality of test signals in accordance with a scheduled time passage to thereby transmit the signals to the mobile communication terminal and receive response signals including predetermined messages from the mobile communication terminal;

a reception measurement unit (4) which measures time domain waveforms of the response signals including the predetermined messages from the mobile communication terminal;

a message log acquiring unit (9) which acquires and stores messages and radio-communication time information when the transmission/reception unit and the mobile communication terminal exchange the respective predetermined messages;

a display unit (7) which displays measured results of the time domain waveforms from the reception measurement unit and the radio-communication time information from the message log acquiring unit; and a display control unit (8) which carries out processing for receiving the measured results of the time domain waveforms from the reception measurement unit and the radio-communication time information from the message log acquiring unit, and for causing to display graphs (7e) indicating the measured results of the time domain waveforms and a predetermined number of radio-communication markers (7c) indicating points in radio-communication time which correspond to the radio-communication time information by a graphic display capable of simultaneously comparing at both sides of the same time base on the display unit.

In order to achieve the above object, according to a second aspect of the present invention, there is provided a test system for a mobile communication terminal, according to the first aspect, wherein the display control unit has:

a coordinate generating unit (8d) which divides a display screen of the display unit into at least a first region and a second region, and which causes to display a first coordinate (7a) where the abscissa is time and the ordinate is power level at the first region, and causes to display a second coordinate (7b) where the abscissa is a time base which is the same as the abscissa of the first coordinate and the ordinate is positions of the mobile communication terminal and the plurality of cells at the second region;

a data display control unit (8a) which causes to display the graphs indicating the measured results of the time domain waveforms at the first coordinate displayed by means of the coordinate generating unit; and a radio-communication marker generating unit (8c) which causes to display a predetermined number of radio-communication markers indicating points in radio-communication time which correspond to the radio-communication time information along the abscissa which is a time base of the second coordinate displayed by means of the coordinate generating unit.

In order to achieve the above object, according to a third aspect of the present invention, there is provided a test system for a mobile communication terminal, according to the second aspect, wherein the radio-communication marker generating unit, as the predetermined number of radio-communication markers, between the mobile communication terminal and respective positions of the plurality of cells on the ordinate in the second coordinate, causes to display capable of recognizing at least one of down radio-communication from the mobile communication terminal to one of the cells and up radio-communication from one of the cell's to the mobile communication terminal, and capable of recognizing the points in radio-communication time which correspond to the radio-communication time information along the abscissa which is a time base of the second coordinate.

In order to achieve the above object, according to a fourth aspect of the present invention, there is provided a test system for a mobile communication terminal, according to the second aspect, wherein the reception measurement unit has a function of measuring a transition time that, in accordance with a response signal from the mobile communication terminal, until it is switched from a state in which the mobile communication terminal receives a first test signal showing a greater strength at a current point in time among the plurality of test signals to a state in which the mobile communication terminal receives a second test signal having a second greater strength among the plurality of test signals accompanying that the plurality of test signals are varied to be successively made to be a greater strength in accordance with the scheduled time passage, the test system for a mobile communication terminal further comprises a determining unit (6) which, upon receiving the measured results of the transition time from the reception measurement unit, carries out success/failure determination as to whether a transition has been a success or a failure in which the mobile communication terminal switches from a state of receiving the first test signal to a state of receiving the second test signal among the plurality of test signals corresponding to the plurality of cells in accordance with the control information from the test procedure control unit, and the data display control unit causes to display capable of recognizing a success/failure as a result of the success/failure determination by the determining unit together with a corresponding radio-communication marker among the predetermined number of radio-communication markers displayed by means of the radio-communication marker generating unit.

In order to achieve the above object, according to a fifth aspect of the present invention, there is provided a test system for a mobile communication terminal, according to the second aspect, wherein the data display control unit causes to display capable of recognizing states from a start up to a time of responding at a point in time when a scheduled response is completed, accompanying a display of the corresponding radio-communication marker among the predetermined number of radio-communication markers displayed by means of the radio-communication marker generating unit, at least one of the first and second coordinates along the abscissa which is a time base of the first and second coordinates displayed by means of the coordinate generating unit.

In order to achieve the above object, according to a sixth aspect of the present invention, there is provided a test system for a mobile communication terminal, according to the second aspect, wherein the message log acquiring unit comprises a storage unit (9a) which acquires and analyzes message information when the transmission/reception unit and the mobile communication terminal exchange the respective predetermined messages, thereby storing at least a part of or a name of the message information so as to be read, and the display control unit has:

a designation marker generating unit (8c) which generates a designation marker that moves in accordance with a selective designation of an operator along the abscissa which is a time base of the second coordinate displayed by means of the coordinate generating unit, and causes to display at least one of the predetermined number of radio-communication markers displayed by means of the radio-communication marker generating unit; and a message display control unit (8e) which, when a specific radio-communication marker among the predetermined number of radio-communication markers is designated by the designation marker displayed by means of the designation marker generating unit, reads out at least a part of or a name of message information corresponding to the specific radio-communication marker from the storage unit of the message acquiring unit and causes to display it on the display unit.

In order to achieve the above object, according to a seventh aspect of the present invention, there is provided a test system for a mobile communication terminal, according to the first aspect, wherein the reception measurement unit includes a spectrum analyzer having a function of analyzing and measuring a response signal from the mobile communication terminal at a time domain.

In order to achieve the above object, according to an eighth aspect of the present invention, there is provided a test system for a mobile communication terminal, according to the second aspect, wherein the test procedure control unit has a computer (PC) and computer readable program code means (CRC) for causing the computer to carry out a transition test for a connection state of the mobile communication terminal of the cellular system, and outputs control information including time setting information in accordance with the computer readable program code means.

In order to achieve the above object, according to a ninth aspect of the present invention, there is provided a test system for a mobile communication terminal, according to the eighth aspect, wherein the determining unit, the message log acquiring unit, and the display control unit are organized together with the test procedure control unit as software of the computer.

In order to achieve the above object, according to a tenth aspect of the present invention, there is provided a test system for a mobile communication terminal, according to the ninth aspect, wherein the computer readable program code means has:

first computer readable program code means for causing the transmission/reception unit to generate a plurality of test signals including predetermined messages corresponding to a plurality of cells in the cellular system in accordance with the control information from the test procedure control unit, and to vary the plurality of test signals in accordance with a scheduled time passage to thereby transmit the signals to the mobile communication terminal and receive response signals including the predetermined messages from the mobile communication terminal;

second computer readable program code means for causing the reception measurement unit to measure time domain waveforms of the response signals including the predetermined messages from the mobile communication terminal;

third computer readable program code means for causing the message log acquiring unit to acquire and store messages and the radio-communication time information when the transmission/reception unit and the mobile communication terminal exchange the respective predetermined messages;

fourth computer readable program code means for causing the display unit to display measured results of the time domain waveforms from the reception measurement unit and the radio-communication time information from the message log acquiring unit; and fifth computer readable program code means for causing the display control unit to carry out processing for receiving the measured results of the time domain waveforms from the reception measurement unit and the radio-communication time information from the message log acquiring unit, and to display graphs indicating the measured results of the time domain waveforms and a predetermined number of radio-communication markers indicating points in radio-communication time which correspond to the radio-communication time information by a graphic display capable of simultaneously comparing at both sides on the same time base on the display unit.

In order to achieve the above object, according to an eleventh aspect of the present invention, there is provided a test system for a mobile communication terminal, according to the tenth aspect, wherein the computer readable program code means further has:

sixth computer readable program code means for causing the coordinate generating unit to divide a display screen of the display unit into at least a first region and a second region, and to display a first coordinate where the abscissa is time and the ordinate is power level on the first region, and a second coordinate where the abscissa is a time base which is the same as the abscissa of the first coordinate and the ordinate is respective positions of the mobile communication terminal and the plurality of cells on the second region;

seventh computer readable program code means for causing the data display control unit to display the graphs indicating the measured results of the time domain waveforms at the first coordinate displayed by means of the coordinate generating unit; and eighth computer readable program code means for causing the radio-communication marker generating unit to display the predetermined number of radio-communication markers indicating points in radio-communication time which correspond to the radio-communication time information along the abscissa which is a time base of the second coordinate displayed by means of the coordinate generating unit.

In order to achieve the above object, according to a twelfth aspect of the present invention, there is provided a test system for a mobile communication terminal, according to the eleventh aspect, wherein the computer readable program code means further has:

ninth computer readable program code means for causing the radio-communication marker generating unit to display, as the predetermined number of radio-communication markers, between the respective positions of the mobile communication terminal and the plurality of cells at the second coordinate, capable of recognizing at least one of down radio-communication from the mobile communication terminal to one of the cells and up radio-communication from one of the cells to the mobile communication terminal, and capable of recognizing the points in radio-communication time which correspond to the radio-communication time information along the abscissa which is a time base of the second coordinate.

In order to achieve the above object, according to a thirteenth aspect of the present invention, there is provided a test system for a mobile communication terminal, according to the twelfth aspect, wherein the computer readable program code means further has:

tenth computer readable program code means for causing the reception measurement unit to, in accordance with a response signal from the mobile communication terminal, measure a transition time that until it is switched from a state in which the mobile communication terminal receives a first test signal showing a greater strength at a current point in time among the plurality of test signals to a state in which the mobile communication terminal receives a second test signal having a second greater strength among the plurality of test signals accompanying that the plurality of test signals are varied to be successively made to be a greater strength in accordance with the scheduled time passage;

eleventh computer readable program code means for causing a determining unit to, upon receiving the measured results of the transition time from the reception measurement unit, carry out success/failure determination as to whether a transition has been a success or a failure in which the mobile communication terminal is switched from a state of receiving the first test signal among the plurality of test signals corresponding to the plurality of cells to a state of receiving the second test signal in accordance with the control information from the test procedure control unit; and twelfth computer readable program code means for causing the data display control unit to display capable of recognizing a success/failure as a result of the success/failure determination by the determining unit together with a corresponding radio-communication marker among the predetermined number of radio-communication markers displayed by means of the radio-communication marker generating unit.

In order to achieve the above object, according to a fourteenth aspect of the present invention, there is provided a test system for a mobile communication terminal, according to the thirteenth aspect, wherein the computer readable program code means further has:

thirteenth computer readable program code means for causing the data display control unit to display capable of recognizing states from a start up to a time of responding at a point in time when a scheduled response is completed, accompanying the display of a corresponding radio-communication marker among the predetermined number of radio-communication markers displayed by means of the radio-communication marker generating unit, at least one of the first and second coordinates along the abscissa which is a time base of the first and second coordinates displayed by means of the coordinate generating unit.

In order to achieve the above object, according to a fifteenth aspect of the present invention, there is provided a test system for a mobile communication terminal, according to the fourteenth aspect, wherein the computer readable program code means further has fourteenth computer readable program code means for causing the storage unit of the message log acquiring unit to acquire and analyze message information when the transmission/reception unit and the mobile communication terminal exchange the respective predetermined messages, thereby storing at least a part of or a name of the message information to be read.

In order to achieve the above object, according to a sixteenth aspect of the present invention, there is provided a test system for a mobile communication terminal, according to the fifteenth aspect, wherein the computer readable program code means further has:

fifteenth computer readable program code means for causing the designation marker generating unit of the display control unit to move in accordance with a selective designation by an operator along the abscissa which is a time base of the second coordinate displayed by means of the coordinate generating unit, and generate a designation marker identifying at least one of the predetermined number of radio-communication markers displayed by means of the radio-communication marker generating unit to be designated; and sixteenth computer readable program code means for causing the message display control unit of the display control unit to, when a specific radio-communication marker among the predetermined number of radio-communication markers is designated by the designation marker displayed by means of the designation marker generating unit, read out at least a part of or a name of the message information corresponding to the specific radio-communication marker from the message acquiring unit, and to display it on the display unit.

In order to achieve the above object, according to a seventeenth aspect of the present invention, there is provided a test method for a mobile communication terminal, comprising:

a step of preparing a test procedure control unit (5) which possesses a procedure for carrying out a transition test for a connection state of a mobile communication terminal (UE 1) of a cellular system, and outputting control information including time setting information in accordance with the procedure from the test procedure control unit;

a step of preparing a transmission/reception unit (3), and in accordance with the control information from the test procedure control unit, generating a plurality of test signals including predetermined messages corresponding to a plurality of cells (21, 22, 23, 24, . . . ) in the cellular system, and varying the plurality of test signals in accordance with a scheduled time passage to thereby transmit the signals to the mobile communication terminal and receive a response signal including a predetermined message from the mobile communication terminal in the transmission/reception unit;

a step of preparing a reception measurement unit (4), and measuring a time domain waveform of the response signal including the predetermined message from the mobile communication terminal in the reception measurement unit;

a step of preparing a message log acquiring unit (9), and acquiring and storing messages and radio-communication time information when the transmission/reception unit and the mobile communication terminal exchange respective messages by means of the message log acquiring unit;

a step of preparing a display unit (7), and displaying measured results of the time domain waveforms from the reception measurement unit, and the radio-communication time information from the message log acquiring unit on the display unit; and a step of preparing a display control unit (8), and carrying out processing for receiving the measured results of the time domain waveforms from the reception measurement unit and the radio-communication time information from the message log acquiring unit, and for causing to display graphs (7e) indicating the measured results of the time domain waveforms and a predetermined number of radio-communication markers (7c) indicating points in radio-communication time which correspond to the radio-communication time information by a graphic display capable of simultaneously comparing at both sides of the same time base on the display unit by means of the display control unit.

In order to achieve the above object, according to an eighteenth aspect of the present invention, there is provided a test method for a mobile communication terminal, according to the seventeenth aspect, wherein the test procedure control unit has a computer (PC) and computer readable program code means (CRC) for causing the computer to carry out a transition test for a connection state of the mobile communication terminal of the cellular system, and outputs control information including time setting information in accordance with the computer readable program code means.

In order to achieve the above object, according to a nineteenth aspect of the present invention, there is provided a test method for a mobile communication terminal, according to the eighteenth aspect, wherein the message log acquiring unit and the display control unit are organized together with the test procedure control unit as software of the computer.

In order to achieve the above object, according to a twentieth aspect of the present invention, there is provided a test method for a mobile communication terminal, according to the nineteenth aspect, wherein the computer readable program code means has:

first computer readable program code means for causing the transmission/reception unit to, in accordance with the control information from the test procedure control unit, generate a plurality of test signals including predetermined messages corresponding to the plurality of cells in the cellular system, and vary the plurality of test signals in accordance with a scheduled time passage to thereby transmit the signals to the mobile communication terminal and receive response signals including the predetermined messages from the mobile communication terminal;

second computer readable program code means for causing the reception measurement unit to measure time domain waveforms of the response signals including the predetermined messages from the mobile communication terminal;

third computer readable program code means for causing the message log acquiring unit to acquire and store messages and radio-communication time information when the transmission/reception unit and the mobile communication terminal exchange the respective predetermined messages;

fourth computer readable program code means for causing the display unit to display measured results of the time domain waveforms from the reception measurement unit and the radio-communication time information from the message log acquiring unit; and fifth computer readable program code means for causing the display control unit to carry out processing for receiving the measured results of the time domain waveforms from the reception measurement unit and the radio-communication time information from the message log acquiring unit, and for causing to display graphs indicating the measured results of the time domain waveforms and a predetermined number of radio-communication markers indicating points in radio-communication time which correspond to the radio-communication time information by a graphic display capable of simultaneously comparing at both sides on the same time base on the display unit.

In order to achieve the above object, according to a twenty-first aspect of the present invention, there is provided a test method for a mobile communication terminal, according to the twentieth aspect, wherein the computer readable program code means further has:

sixth computer readable program code means for causing a coordinate generating unit (8d) of the display control unit to divide a display screen (71) of the display unit into at least a first region (72) and a second region (73), and to display a first coordinate (7a) where the abscissa is time and the ordinate is power level on the first region, and a second coordinate (7b) where the abscissa is a time base which is the same as the abscissa of the first coordinate and the ordinate is respective positions of the mobile communication terminal and the plurality of cells on the second region;

seventh computer readable program code means for causing a data display control unit (8a) of the display control unit to display graphs indicating the measured results of the time domain waveforms at the first coordinate displayed by means of the coordinate generating unit; and eighth computer readable program code means for causing a radio-communication marker generating unit (8b) of the display control unit to display a predetermined number of radio-communication markers indicating points in radio-communication time which correspond to the radio-communication time information along the abscissa which is a time base of the second coordinate displayed by means of the coordinate generating unit.

In order to achieve the above object, according to a twenty-second aspect of the present invention, there is provided a test method for a mobile communication terminal, according to the twenty-first aspect, wherein the computer readable program code means further has:

ninth computer readable program code means for causing the radio-communication marker generating unit of the display control unit to display capable of recognizing, as the predetermined number of radio-communication markers, between the respective positions of the mobile communication terminal and the plurality of cells on the ordinate at the second coordinate, at least one of down radio-communication from the mobile communication terminal to one of the cells and up radio-communication from one of the cells to the mobile communication terminal, and capable of recognizing the points in radio-communication time which correspond to the radio-communication time information along the abscissa which is a time base of the second coordinate.

In order to achieve the above object, according to a twenty-third aspect of the present invention, there is provided a test method for a mobile communication terminal, according to the twenty-second aspect, wherein the computer readable program code means further has:

tenth computer readable program code means for causing the reception measurement unit to, in accordance with the response signals from the mobile communication terminal, measure a transition time that until it is switched from a state in which the mobile communication terminal receives a first test signal showing a greater strength at a current point in time among the plurality of test signals to a state in which the mobile communication terminal receives a second test signal having a second greater strength among the plurality of test signals accompanying that the plurality of test signals are varied to be successively made to be a greater strength in accordance with the scheduled time passage;

eleventh computer readable program code means for causing the determining unit to, upon receiving the measured results of the transition time from the reception measurement unit, carry out success/failure determination as to whether a transition has been a success or a failure in which the mobile communication terminal is switched from a state of receiving the first test signal among the plurality of test signals corresponding to the plurality of cells to a state of receiving the second test signal in accordance with the control information from the test procedure control unit; and twelfth computer readable program code means for causing the data display control unit of the display control unit to display capable of recognizing a success/failure as the result of the success/failure determination by the determining unit together with a corresponding radio-communication marker among the predetermined number of radio-communication markers displayed by means of the radio-communication marker generating unit.

In order to achieve the above object, according to a twenty-fourth aspect of the present invention, there is provided a test method for a mobile communication terminal, according to the twenty-third aspect, wherein the computer readable program code means further has:

thirteenth computer readable program code means for causing the data display control unit to display capable of recognizing states from a start up to a time of responding at a point in time when a scheduled response is completed, accompanying the display of a corresponding radio-communication marker among the predetermined number of radio-communication markers displayed by means of the radio-communication marker generating unit, at least one of the first and second coordinates along the abscissa which is a time base of the first and second coordinates displayed by means of the coordinate generating unit.

In order to achieve the above object, according to a twenty-fifth aspect of the present invention, there is provided a test method for a mobile communication terminal, according to the twenty-fourth aspect, wherein the computer readable program code means further has:

fourteenth computer readable program code means for causing the storage unit of the message log acquiring unit to acquire and analyze message information when the transmission/reception unit and the mobile communication terminal exchange the respective predetermined messages, thereby storing at least a part of or a name of the message information to be read.

In order to achieve the above object, according to a twenty-sixth aspect of the present invention, there is provided a test method for a mobile communication terminal, according to the twenty-fifth aspect, wherein the computer readable program code means further has:

fifteenth computer readable program code means for causing the designation marker generating unit of the display control unit to move in accordance with a selective designation by an operator along the abscissa which is a time base of the second coordinate displayed by means of the coordinate generating unit, and to generate a designation marker identifying at least one of the predetermined number of radio-communication markers displayed by means of the radio-communication marker generating unit to be designated; and sixteenth computer readable program code means for causing the message display control unit of the display control unit to, when a specific radio-communication marker among the predetermined number of radio-communication markers is designated by the designation marker displayed by the designation marker generating unit, read out at least a part of or a name of the message information corresponding to the specific radio-communication marker from the message acquiring unit, and to display it on the display unit.

BRIEF DESCRIPTION OF DRAWINGS

FIG. 2A is a view for explaining an example in which a state of exchanging messages between a mobile communication terminal (UE) 1 and cells 21 and 22, and a waveform of a response signal from the mobile communication terminal (UE) 1 at that time are displayed as one example of a display by a display control unit of FIG. 1.

FIG. 2B is a view for explaining transmitting power levels between the cells 21 and 22 of FIG. 2A.

BEST MODE FOR CARRYING OUT THE INVENTION

Hereinafter, one embodiment of a test system for a mobile communication terminal according to the present invention will be described with reference to the drawings.

Figure 1:
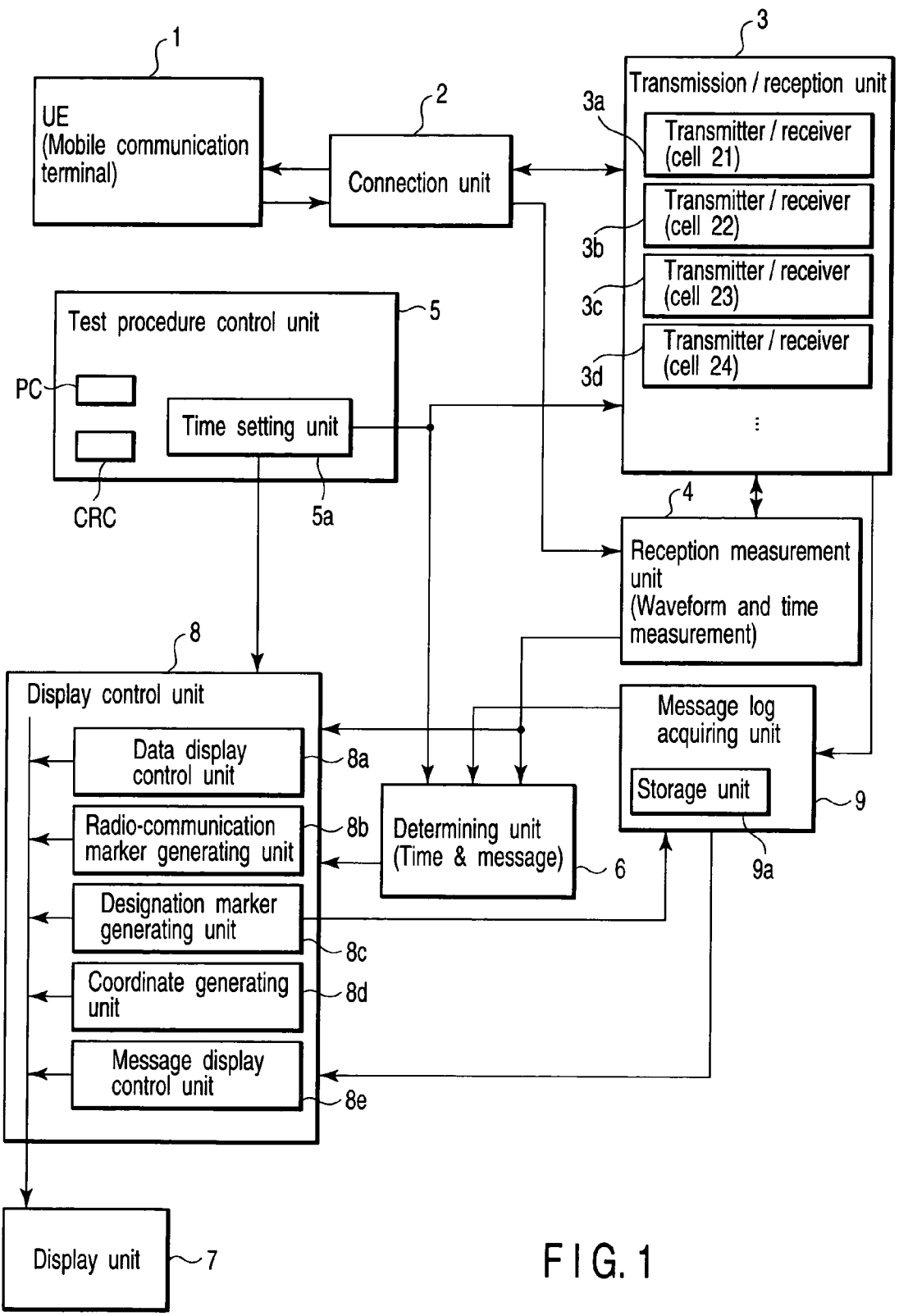
FIG. 1 is a functional block diagram showing a configuration of a test system for a mobile communication terminal according to one embodiment of the present invention.

FIG. 1 is a block diagram showing a functional configuration of the test system for the mobile communication terminal according to the invention.

FIG. 2A is a view for explaining an example in which radio-communication states of messages between a mobile communication terminal (UE) 1 and cells 21 and 22, and waveforms of response signals from the mobile communication terminal (UE) 1 at that time, are displayed as one example of a display by a display control unit of FIG. 1.

FIG. 2B is a view for explaining transmitting power levels between the cells 21 and 22 of FIG. 2A.

Figure 3:
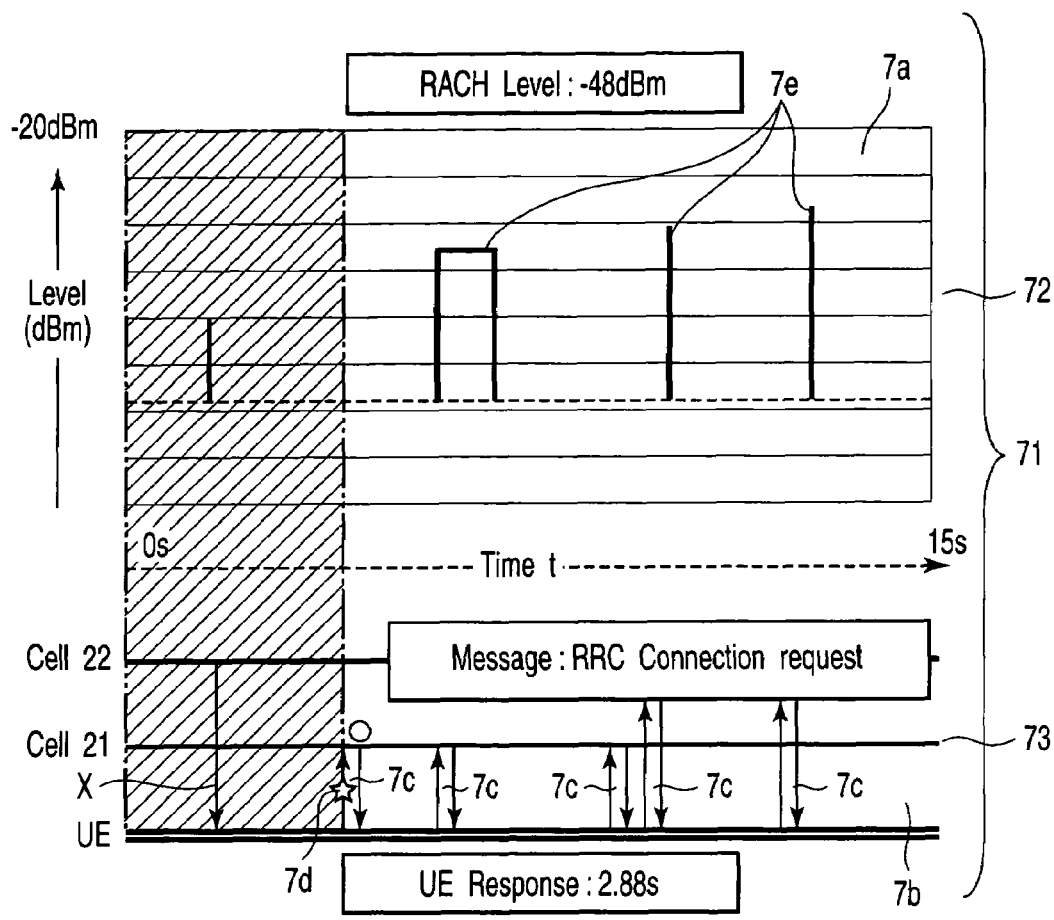
FIG. 3 is a view for explaining an example in which a state of exchanging messages between a mobile communication terminal (UE) 1 and cells 21 and 22, and a waveform of a response signal from the mobile communication terminal (UE) 1 at that time are displayed as another example of a display by the display control unit of FIG. 1.
Figure 4:
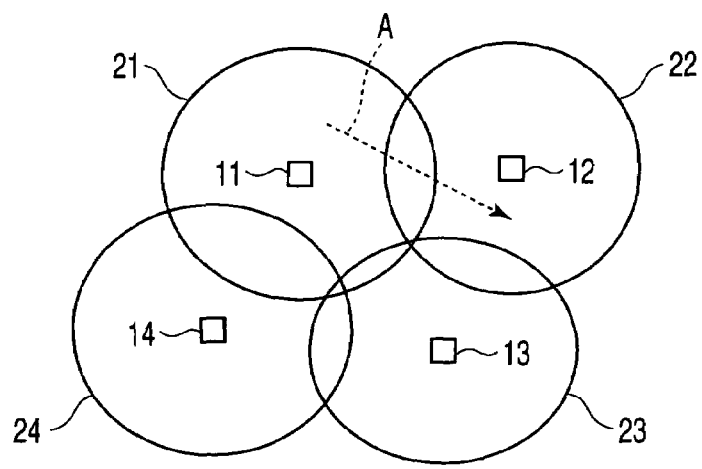
FIG. 4 is a diagram for explaining the relationship between cells (service areas) and base stations in a cellular system conventionally known.

FIG. 3 is a view for explaining an example in which radio-communication states of messages between the mobile communication terminal (UE) 1 and the cells 21 and 22, and waveforms of response signals from the mobile communication terminal (UE) 1 at that time, are displayed as another example of a display by the display control unit of FIG. 1.

First, the functional configuration of the embodiment of the test system for the mobile communication terminal according to the invention will be described on the basis of FIG. 1.

Figure 5:
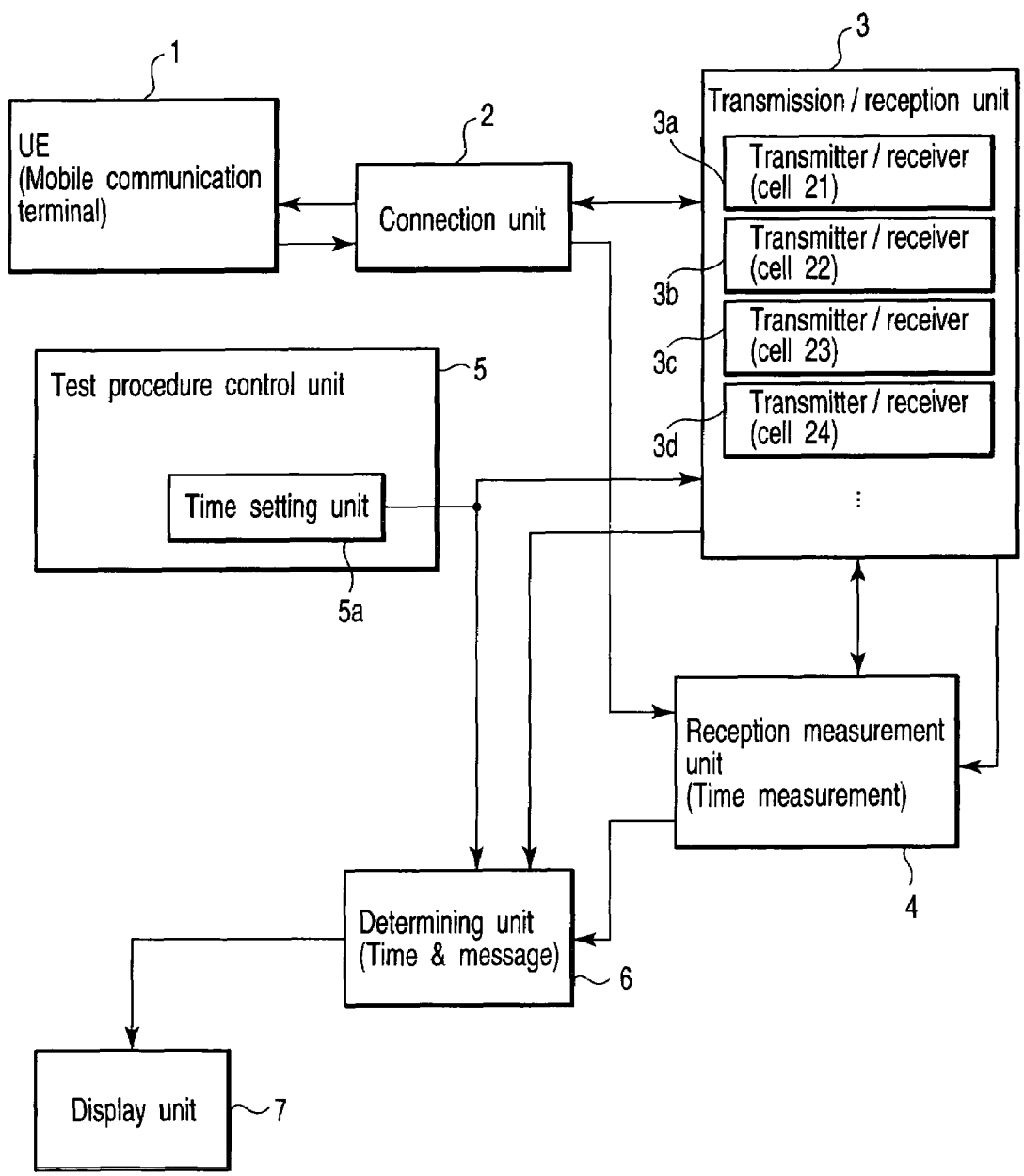
FIG. 5 is a functional block diagram showing a configuration of a conventional test system for a mobile communication terminal which carries out an RRM test.

In FIG. 1, the functions of the mobile communication terminal (UE) 1, a connection unit 2, a transmission/reception unit 3, and a test procedure control unit 5 with reference numerals which are the same as those of FIG. 5 described in Background Art section are the same as the functions of those of FIG. 5 as well, and therefore, detailed descriptions thereof will be omitted.

Accordingly, the functions of a reception measurement unit 4, a determining unit 6, and a display unit 7 which are different from the functions of those in FIG. 5, and a display control unit 8 and a message log acquiring unit 9 which are newly provided, will be mainly described hereinafter.

First, as shown in FIG. 1, the test system for the mobile communication terminal according to the embodiment of the invention is, as the basic configuration, configured of: the test procedure control unit 5 which possesses a procedure for carrying out a transition test of a connection state of the mobile communication terminal (UE) 1 of a cellular system, and which outputs control information including time setting information in accordance with the procedure; the transmission/reception unit 3 which generates a plurality of test signals including a predetermined message and corresponding to a plurality of cells 21, 22, 23, 24, ..., in the cellular system in accordance with the control information from the test procedure control unit 5, and which varies the plurality of test signals in accordance with a scheduled time passage to thereby transmit the signals to the mobile communication terminal (UE) 1 and receive response signals including the predetermined messages from the mobile communication terminal (UE) 1; the reception measurement unit 4 which measures time domain waveforms of the response signals including the predetermined messages from the mobile communication terminal (UE) 1; the message log acquiring unit 9 which acquires and stores the messages and the radio-communication time information at the time when the transmission/reception unit 3 and the mobile communication terminal (UE) 1 exchange the predetermined messages; the display unit 7 which displays the measured results of the time domain waveforms from the reception measurement unit 4, and the radio-communication time information from the message log acquiring unit 9; and the display control unit 8 which receives the measured results of the time domain waveforms from the reception measurement unit 4 and the radio-communication time information from the message log acquiring unit 9, and which causes to display graphs 7e indicating the measured results of the time domain waveforms and a predetermined number of radio-communication markers 7c indicating points in radio-communication time which correspond to the radio-communication time information by a graphic display capable of simultaneously comparing at both sides of the same time base on the display unit 7.

Specifically, in FIG. 1, the reception measurement unit 4 receives a response signal output from the mobile communication terminal (UE) 1 so as to tune the frequency of the signal, measures the signal at a time domain, and stores the measured waveform.

The reception measurement unit 4 also has a function of, in accordance with a response signal from the mobile communication terminal (UE) 1, measuring a transition time that it is switched from a state in which the mobile communication terminal (UE) 1 receives a first test signal showing a greater intensity at a current point in time among the plurality of test signals to a state in which the mobile communication terminal (UE) 1 receives a second test signal having a second greater intensity among the plurality of test signals according that the plurality of test signals are successively made to be greater intensity in accordance with the scheduled time passage.

Further, the reception measurement unit 4 measures a time in which the mobile communication terminal (UE) 1 carries out switching the cells in accordance with variations in signals corresponding to the plurality of cells 21, 22, 2 of the transmission/reception unit 3.

The determining unit 6 determines whether or not a transition between the cells of a connection state at the mobile communication terminal (UE) 1 is carried out within a predetermined time, and determines the contents of the messages in a test in which the mobile communication terminal (UE) 1 makes a call with the system simulator (the transmission/reception unit 3 and the reception measurement unit 4).

The times and messages which will be standards for determinations at the determining unit 6 are supplied in advance from the test procedure control unit 5.

The message log acquiring unit 9 receives a message which the mobile communication terminal (UE) 1 outputs at the time of exchanging a message with the transmission/reception unit 3, at the transmission/reception unit 3, and acquires the radio-communication message outputted from the transmission/reception unit 3. Then, the message log acquiring unit 9 analyses the contents thereof to store at least a part of or the name thereof in a storage unit 9a, and acquires (measures) the radio-communication time information of the message with the transmission/reception unit 3.

In this case, suppose that the message acquired at the message log acquiring unit 9 includes a message which the mobile communication terminal (UE) 1 outputs in response to the message from the transmission/reception unit 3.

Further, at least a part of or a name of the message acquired in the way described above is stored in the storage unit 9a of the message log acquiring unit 9 to be read by a designation marker generating unit 8c of the display control unit 8 which will be described later, such that the radio-communication time of the message, the origin of transmission and the destination address of the message, and the like, can be identified.

Accordingly, in addition to at least a part of or a name of the message acquired in the way described above, the storage unit 9a of the message log acquiring unit 9 stores therein information for identifying a cell outputting the message, and for identifying whether it is up radio-communication from the cell to the mobile communication terminal (UE) 1 or down radio-communication from the mobile communication terminal (UE) 1 to the cell.

In the above description, the case in which the message log acquiring unit 9 deals with only the message from the mobile communication terminal (UE) 1 is described. However, a message transmitted from the transmission/reception unit 3 to the mobile communication terminal (UE) 1 as well may be dealt with in the same way as the message from the mobile communication terminal (UE) 1.

The message log acquiring unit 9 is configured as an independent block in order to functionally describe in FIG. 1. However, the message log acquiring unit 9 may be provided in the transmission/reception unit 3.

Then, in a manner of speaking, the message log acquiring unit 9 has acquired a message exchanging record, and acquires a radio-communication record relating to a response signal and a messages as the entire system, including the message exchanging record and the waveform of a response signal from the mobile communication terminal (UE) 1.

The display control unit 8 configures the most featured portion of the present invention, and is configured of a data display control unit 8a, a radio-communication marker generating unit 8b, the designation marker generating unit 8c, a coordinate generating unit 8d, and a message log display control unit 8e.

The data display control unit 8a is configured for causing to display numeric data measured by the reception measurement unit 4, determined results of the determining unit 6, and the like, as numeric data on the display unit 7 in the same way as in the conventional art, and so as to carry out a graphic display as a peculiar function to the invention as will be described later.

The coordinate generating unit 8d generates a coordinate for causing to display the time passage of the measurement which has been scheduled and the radio-communication progress of the message in advance, on the display screen of the display unit 7, in accordance with the test procedure stored in the test procedure control unit 5 according to the regulation regulated in the non-Patent document described above, for example, as a regulation in the W-CDMA communication system.

For example, as shown in FIG. 2A, the coordinate generating unit 8d divides display screen 71 of the display unit 7 into two; a first region 72 showing a first coordinate 7a where the abscissa expresses time and the ordinate expresses power level is prepared at the upper stage; a second region 73 showing a second coordinate 7b where the abscissa has the same time base in common with the abscissa of the first coordinate 7a, and the ordinate is made to be the positions of the mobile communication terminal (UE) 1, the cell 21, and the cell 22 is prepared at the lower stage; and those first coordinate 7a and second coordinate 7b are simultaneously displayed on the display screen 71 of the display unit 7.

Here, with respect to setting of the times on the abscissa in common with the first coordinate 7a and the second coordinate 7b, for example, in a test for switching from a state in which the mobile communication terminal (UE) 1 is receiving a signal corresponding to the cell 21 from the transmission/reception unit 3 to a state of receiving a signal corresponding to the cell 22 due to the transmission/reception unit 3 varying the level of the signal corresponding to the cell 22 to be higher than the level of the signal corresponding to the cell 21 in response to the request applied to the transmission/reception unit 3 in accordance with the time information set from the test procedure control unit 5, the setting of the times are carried out given that a time of the transmission/reception unit 3 to respond to the request t=0 s, and a time to complete the switching t=15 s.

These setting of the times are determined on the basis of the information on measurement conditions, items, and the like from the test procedure control unit 5, and thereby displayed along the time base of the abscissa in common with the first coordinate 7a and the second coordinate 7b on the display screen 7a of the display unit 7.

The data display control unit 8a is configured for causing to display the time domain waveform of the response signal, the signal being measured by the reception measurement unit 4 and being output from the mobile communication terminal (UE) 1, on the first region 72 serving as the first coordinate 7a on the display screen 71 of the display unit 7 displayed by means of the coordinate generating unit 8d as described above.

It goes without saying that the data display control unit 8a is configured so as to display the level of the signal and numeric data such as a response time and the like when there is a response signal from the mobile communication terminal (UE) 1 (refer to FIGS. 2A and 3).

The radio-communication marker generating unit 8b generates radio-communication markers 7c. By the radio-communication markers 7c, between which cell and the mobile communication terminal (UE) 1 the message is exchanged, from which cell or the mobile communication terminal (UE) 1 the incoming direction of the message is, when the message was generated, and the like, can be easily recognized on the basis of the radio-communication records of the mobile communication terminal (UE) 1 and the transmission/reception unit 3 acquired by the message log acquiring unit 9.

The radio-communication marker generating unit 8b is configured such that a predetermined number of radio-communication markers 7c are generated by vertical lines with arrows indicating an incoming direction of a message for each message, whereby as shown on the second region 73 of FIG. 2A, the predetermined number of radio-communication markers 7c are displayed so as to associate the respective positions of the corresponding cells and the mobile communication terminal (UE) 1 on the ordinate of the second coordinate 7b with the corresponding radio-communication time positions along the abscissa which is a time base of the second coordinate 7b displayed on the display screen 71 of the display unit 7.

Note that, in the present invention, the radio-communication markers 7c are displayed also with respect to the messages from the transmission/reception unit 3 to the mobile communication terminal (UE) 1 as shown in FIGS. 2A and 3.

The reason for this is that, although only the malfunction at the one side can be distinguished by only the radio-communication marker 7c of the message from one side when the mobile communication terminal (UE) 1 and the transmission/reception unit 3 are in a state of radio-communication, if the radio-communication markers 7c from both sides are displayed, any of the malfunctions at both sides can be easily distinguished.

Accordingly, basically, the radio-communication marker generating unit 8b may be configured so as to generate a predetermined number of radio-communication markers 7c indicating the points in radio-communication time which correspond to the radio-communication time information along the abscissa which is a time base of the second coordinate, and to causing to display those predetermined number of radio-communication markers 7c.

The designation marker generating unit 8c generates a designation marker 7d (refer to the asterisk of FIG. 3, a marker having a shape different from the radio-communication markers 7c) by which an operator can selectively designate one of the radio-communication markers 7c displayed by means of the radio-communication marker generating unit 8b, and to causes to display the designation marker 7d to correspond to the radio-communication marker 7c to be selected.

Various shapes of the designation marker 7d can be considered. However, if the color of the designated radio-communication marker 7c is made to vary at the time of being designated by the designation marker 7d, it is convenient because it is easy to distinguish being selected or being unselected.

Further, when a specific radio-communication marker 7c is selected on the display screen 71 of the display unit 7, the designation marker generating unit 8c is configured so as to transmit identification information for designating the specific radio-communication marker 7c to the message log acquiring unit 9.

The message log acquiring unit 9 reads a part of or a name of a message corresponding to the radio-communication marker 7c specified at the designation marker generating unit 8c on the basis of the identification information for designating a specific radio-communication marker 7c from the designation marker generating unit 8c, and transmits the part of or the name of the message to the message display control unit 8e, thereby displaying part of or the name of the message on the display screen 71 of the display unit 7.

In this case, the message display control unit 8e may cause to display part of or the name of the specific message transmitted from the message log acquiring unit 8e on a frame which is separated from or to be overlapped upon those coordinates, or on another screen, differently from the first region 72 and the second region 73 on the display screen 71 of the display unit 7.

For example, in this case, as a message corresponding to the designation marker 7d and the radio-communication marker 7c designated by the designation marker 7d, a message name "RRC Connection Request" is displayed as shown in FIG. 3.

Here, RRC is an abbreviation for radio resource control, and a name of a sub-layer of a radio-communication interface third layer.

This makes it possible for the operator to recognize that there is a request for connection from the mobile communication terminal (UE) 1 to the cell 21 due to the display of the designation marker 7d, the radio-communication marker 7c designated by the designation marker 7d, and the message name "RRC Connection Request".

The determining unit 6 receives time information of a response signal measured by the reception measurement unit 4, and determines whether or not it has responded within a regulated time.

The determining unit 6 carries out determination on a success/failure that a transition in which the mobile communication terminal (UE) 1 switches from a state of receiving the first test signal among the plurality of test signals corresponding to the plurality of cells 21, 22, 23, 24, . . . , to a state of receiving the second test signal has been a success or a failure in accordance with the control information from the test procedure control unit 5 by receiving the measured result of the transition time from the reception measurement unit 4.

Further, the determining unit 6 determines whether or not a scheduled message has responded within a regulated time on the basis of a message acquired by the message log acquiring unit 9 and a response time of the message.

Here, the determining unit 6 receives the time information which will be the standard needed for a determination in advance from the time setting unit 5a of the test procedure control unit 5.

Further, the determining unit 6 receives a message which will be the standard needed for a determination in advance from the transmission/reception unit 3 via the message log acquiring unit 9.

Then, the determined results at the determining unit 6 may be, along with numeric data, displayed in a list at a display frame different from the first region 72 and the second region 73 on the display screen 71 of the display unit 7 via the data display control unit 8a, or as will be described later, may be displayed together with the radio-communication markers 7c and the like with marks of ○X indicating whether the switching of the connection states of the mobile communication terminal (UE) 1 has been a success or a failure.

Hereinafter, a flow will be described by using operations for measuring a time in which a connection state of the mobile communication terminal (UE) 1 is switched from the cell 22 to the cell 21 as an example on the basis of FIGS. 2A and 2B.

Here, in FIG. 2A, the portion shown by reference numeral 71 is actually displayed as a display screen on the display screen of the display unit 7.

FIG. 2B is a view showing a timing relationship for explaining transmitting power levels between the cells 21 and 22.

(1) Although control is carried out with respect to each portion in accordance with the test procedure which the test procedure control unit 5 has possessed in advance, the time passage is set at the time setting unit 5a in the test procedure control unit 5.

(2) At the beginning, as shown in the timing diagram of FIG. 2B, the level of the transmitting power (signal strength) from a transmitter/receiver 3a (cell 21) is weak (L), and the level of the transmitting power (signal strength) from a transmitter/receiver 3b (cell 22) is strong (H). Therefore, when the mobile communication terminal (UE) 1 is a state of radio-communicating with the cell 22, the cell 22 starts to reduce the level of the transmitting power from the cell 22 and the cell 21 starts to raise the level of the transmitting power from the cell 21 at time t0.

The level of the transmitting power from the cell 21 and the level of the transmitting power from the cell 22 are made same at time t1.

Up to this stage, the mobile communication terminal (UE) 1 holds in a state of receiving the cell 22.

A switching time from the time t1 until the mobile communication terminal (UE) 1 receives the cell 21 is an evaluation object for the test. Therefore, assuming that the time t1 is the start point of the abscissa (which may be displayed as a measurement start point, for example, 0 sec), and a regulated time for switching is Δt, the coordinate generating unit 8d displays it as an end time t7 (t1+Δt, for example, may be displayed as 15 sec).

In accordance therewith, the coordinate generating unit 8d causes to display the first coordinate 7a on the first region 72 and the second coordinate 7b on the second region 73 on the display screen 71 of the display unit 7.

(3) At time t2, the mobile communication terminal (UE) 1 transmits a response signal "RRC Connection Request" as a preamble part to the cell 21 in response to the cell 21.

This time t1 to t2 is an evaluation for the time up to the switching of the cells of the mobile communication terminal (UE) 1.

On the basis of the results measured/acquired by the reception measurement unit 4 and the message log acquiring unit 9 at time t2, a level "RACH Level: 51.23 dBm" is, along with the measured level waveform 7e, displayed as numeric data at the first region 72 on the display screen 71 of the display unit 7, and a time "UE Response: 7.68 sec" is, along with the radio-communication marker 7c by the vertical line with an arrow, displayed as numeric data at the second region 73 by means of the data display control unit 8a and the radio-communication marker generating unit 8b.

Thereafter, a response signal from the cell 21 to the mobile communication terminal (UE) 1 is transmitted, and a radio-communication marker 7c of the arrow indicating the response is displayed.

Then, in this case, the mark of ○ indicating that the switching of the connection state of the mobile communication terminal (UE) 1 has succeeded within a predetermined time is displayed above the radio-communication marker 7c.

(4) Thereafter, radio-communication is carried out in accordance with the test procedure which the test procedure control unit 5 has possessed in advance.

For example, when data is transmitted from the mobile communication terminal (UE) 1 to the cell 21 at time t3, the transmitting level waveform (which continues from time t3 to time t4) 7e is displayed at the region 72 on the display screen 71 of the display unit 7.

(5) Moreover, radio-communication is repeated between the mobile communication terminal (UE) 1 and the cell 21 at time t5 and time t6, and the test is completed.

At that time, at the respective times t5 and t6, the measured level waveforms 7e at corresponding times are displayed at the region 72 on the display screen 71 of the display unit 7, and the radio-communication markers 7c by vertical lines with arrows at the corresponding times t5 and t6 are displayed at the second region 73.

(6) Thereafter, the above-described tests from times t1 to t7 are repeatedly carried out.

In this way, in accordance with the test system for a mobile communication terminal in accordance with the present embodiment, the measured waveforms of the response signals from the mobile communication terminal (UE) 1 and the radio-communication markers 7c indicating the message radio-communication states are compared at both sides of the same time base while being simultaneously displayed by a graphic display as shown in FIG. 2A. Therefore, an operator can obtain the advantage that, when an abnormality is brought about, it can be easily checked whether or not signals and messages which have been scheduled in the test procedure possessed by the test procedure control unit 5 are being carried out so as to correspond to one another within scheduled times, by scheduled cells and scheduled messages by grasping those so as to be visually recognizable.

For example, abnormalities can be known in which such that a message is transmitted from the mobile communication terminal (UE) 1 at an unscheduled time (for example, refer to the radio-communication marker indicated with reference numeral X in FIG. 3 and the measured level waveform at that time), or although a signal has been transmitted from the mobile communication terminal (UE) 1, the message has not been transmitted, or the message has not been analyzed due to the level thereof being made down, and the like.

When the radio-communication marker 7c is being displayed, the operator designates it by overlapping the designation marker 7d upon the specific radio-communication marker 7c by the designation marker generating unit 8c (the asterisk in FIG. 3). In this case, the message display control unit 8e reads out the name of the message corresponding to the specific radio-communication marker from the message log acquiring unit 9, and displays it on the display unit 7.

In this case, for example, a message corresponding to the radio-communication marker 7c designated by the designation marker 7d with the asterisk in FIG. 3 is displayed as "Message: RRC Connection Request" in the second region 73 of FIG. 3.

In accordance therewith, the operator can confirm the contents of the message in a state of abnormal.

Further, as shown in FIG. 3, accompanying the display of the radio-communication marker 7c, it may be colored with a color from the start up to the time of responding, e.g., blue (in FIG. 3, diagonals for convenience) at a point in time when the scheduled response is completed.

In this case, the color may be changed in accordance with a determination of the response. In addition, the determined result by the determining unit 6 may be added above the radio-communication marker 7c in a ○X format indicating whether the switching of the connection state of the mobile communication terminal (UE) 1 as described above has been a success or a failure.

The test procedure control unit 5 has, for example, a personal computer PC and computer readable program code means (CRC) in which a program for causing the computer PC to carry out a transition test of a connection state of the mobile communication terminal (UE) 1 of the cellular system has been recorded in advance on a recording medium, and is configured so as to output control information including the time setting information in accordance with the computer readable program code means (CRC). Accordingly, the test procedure control unit 5 may be configured so as to manage the entire control for carrying out the transition test of the connection state of the mobile communication terminal (UE) 1 via the system simulator.

Further, the determining unit 6, the message log acquiring unit 9, and the display control unit 8 may be organized along with the test procedure control unit 5 as software of the computer PC.

In this case, the computer readable program code means (CRC) comprises: first computer readable program code means for causing the transmission/reception unit 3 to generate the plurality of test signals including predetermined messages corresponding to the plurality of cells 21, 22, 23, 24, . . . , in the cellular system in accordance with the control information from the test procedure control unit 5, and vary the plurality of test signals in accordance with a scheduled time passage to thereby transmit the signals to the mobile communication terminal (UE) 1 and receive response signals including the predetermined messages from the mobile communication terminal (UE) 1; second computer readable program code means for causing the reception measurement unit 4 to measure time domain waveforms of the response signals including the predetermined messages from the mobile communication terminal (UE) 1; third computer readable program code means for causing the message log acquiring unit 9 to acquire and store the messages and the radio-communication time information when the transmission/reception unit 3 and the mobile communication terminal (UE) 1 exchange the respective predetermined messages; fourth computer readable program code means for causing the display unit 7 to display measured results of the time domain waveforms from the reception measurement unit 4 and the radio-communication time information from the message log acquiring unit 9; and fifth computer readable program code means for causing the display control unit 8 to receive the measured results of the time domain waveforms from the reception measurement unit 4 and the radio-communication time information from the message log acquiring unit 9, and carry out processing for displaying graphs 7e indicating the measured results of the time domain waveforms and a predetermined number of radio-communication markers 7c indicating points in radio-communication time which correspond to the radio-communication time information on the display unit 7 by a graphic display capable of simultaneously comparing at both sides on the same time base.

The computer readable program code means CRC may further comprise: sixth computer readable program code means for causing the coordinate generating unit 8d to divide the display screen 71 of the display unit 7 into at least the first region 71 and the second region 72, and to display the first coordinate 7a where the abscissa is time and the ordinate is power level on the first region 72, and the second coordinate 7b where the abscissa is a time base which is the same as the abscissa of the first coordinate 7a and the ordinate is respective positions of the mobile communication terminal (UE) 1 and the plurality of cells 21 and 22 on the second region 73; seventh computer readable program code means for causing the data display control unit 8a to display the graphs 7e indicating the measured results of the time domain waveforms at the first coordinate 7a displayed by means of the coordinate generating unit 8d; and eighth computer readable program code means for causing the radio-communication marker generating unit 8b to display the predetermined number of radio-communication markers 7c indicating points in radio-communication time which correspond to the radio-communication time information along the abscissa which is a time base of the second coordinate 7b displayed by means of the coordinate generating unit 8d.

The computer readable program code means CRC may further comprise ninth computer readable program code means for causing the radio-communication marker generating unit 8b to display capable of recognizing, as the predetermined number of radio-communication markers, between the respective positions of the mobile communication terminal (UE) 1 and the plurality of cells 21 and 22 at the second coordinate 7b, at least one of down radio-communication from the mobile communication terminal (UE) 1 to one of the cells 21 and 22 and up radio-communication from one of the cells 1 and 22 to the mobile communication terminal (UE) 1, and capable of recognizing the points in radio-communication time which correspond to the radio-communication time information along the abscissa which is a time base of the second coordinate 7b.

The computer readable program code means CRC may further comprise tenth computer readable program code means for causing the reception measurement unit 4 to, in accordance with the response signals from the mobile communication terminal (UE) 1, measure a transition time that until it is switched from a state in which mobile communication terminal (UE) 1 receives a first test signal showing a greater strength at a current point in time among the plurality of test signals to a state in which the mobile communication terminal (UE) 1 receives a second test signal having a second greater strength among the plurality of test signals accompanying that the plurality of test signals are varied so as to be successively made to be a greater strength in accordance with the scheduled time passage; eleventh computer readable program code means for causing the determining unit 6 to carry out success/failure determination as to whether a transition has been a success or a failure in which the mobile communication terminal (UE) 1 is switched from a state of receiving the first test signal among the plurality of test signals corresponding to the plurality of cells 21 and 22 to a state of receiving the second test signal in accordance with the control information from the test procedure control unit 5 by receiving the measured results of the transition time from the reception measurement unit 4; and twelfth computer readable program code means for causing the data display control unit 8a to display capable of recognizing a success/failure, as the result of the success/failure determination by the determining unit 6, together with the corresponding radio-communication marker 7c among the predetermined number of radio-communication markers 7c displayed by means of the radio-communication marker generating unit.

The computer readable program code means CRC may further comprise thirteenth computer readable program code means for causing the data display control unit 8a to display capable of recognizing states from a start up to a time of responding at a point in time when a scheduled response is completed, accompanying the display of the corresponding radio-communication marker 7c among the predetermined number of radio-communication markers 7c displayed by means of the radio-communication marker generating unit 8b, at least one of the first and second coordinates 7a and 7b along the abscissa which is a time base of the first and second coordinates 7a and 7b displayed by means of the coordinate generating unit 8d.

The computer readable program code means CRC may further comprise fourteenth computer readable program code means for causing the message log acquiring unit 9 to store at least a part of or a name of the message information so as to be read by acquiring and analyzing message information when the transmission/reception unit 3 and the mobile communication terminal (UE) 1 exchange the respective predetermined messages.

The computer readable program code means CRC may further comprise: fifteenth computer readable program code means for causing the designation marker generating unit 8c of the display control unit to move in accordance with a selective designation by the operator along the abscissa which is a time base of the second coordinate 2b displayed by means of the coordinate generating unit 8d, and to generate the designation marker 7d identifying at least one of the predetermined number of radio-communication markers 7c displayed by means of the radio-communication marker generating unit 8b to be designated; and sixteenth computer readable program code means for causing the message display control unit 8e of the display control unit 8 to read out at least a part of or a name of the message information corresponding to the specific radio-communication marker from the message acquiring unit 9, and to display it on the display unit 7, when a specific radio-communication marker 7c among the predetermined number of radio-communication markers 7c is designated by the designation marker 7d displayed by means of the designation marker generating unit 8c.

Accordingly, as described above in detail, in accordance with the present invention, in a connection transition test or the like by the system simulator of the mobile communication terminal, a test system for a mobile communication terminal can be provided in which, due to response states and signal waveforms of messages at the time of the test being displayed by a graphic display capable of simultaneously comparing at both sides of the same time base, an operator can grasp those so as to be visually recognizable.

The invention claimed is:

1. A test system for a mobile communication terminal comprising:
    a test procedure control unit which executes a procedure for carrying out a transition test for a connection state of a mobile communication terminal of a cellular system, and which outputs control information including time setting information in accordance with the procedure;
    a transmission/reception unit which, in accordance with the control information from the test procedure control unit, generates a plurality of test signals including predetermined messages corresponding to a plurality of cells in the cellular system, and which varies the plurality of test signals in accordance with a scheduled time passage to thereby transmit the signals to the mobile communication terminal and receive response signals including predetermined messages from the mobile communication terminal;
    a reception measurement unit which measures time domain waveforms of the response signals including the predetermined messages from the mobile communication terminal;
    a message log acquiring unit which acquires and stores messages and radio-communication time information when the transmission/reception unit and the mobile communication terminal exchange the respective predetermined messages;
    a display unit which displays measured results of the time domain waveforms from the reception measurement unit and the radio-communication time information from the message log acquiring unit; and
    a display control unit which carries out processing for receiving the measured results of the time domain waveforms from the reception measurement unit and the radio-communication time information from the message log acquiring unit, and for causing to display graphs indicating the measured results of the time domain waveforms and a predetermined number of radio-communication markers indicating points in radio-communication time which correspond to the radio-communication time information by a graphic display capable of simultaneously comparing at both sides of the same time base on the display unit;
    wherein the display control unit includes:
        a coordinate generating unit which divides a display screen of the display unit into at least a first region and a second region, and which causes to display a first coordinate where the abscissa is time and the ordinate is power level at the first region, and causes to display a second coordinate where the abscissa is a time base which is the same as the abscissa of the first coordinate and the ordinate is positions of the mobile communication terminal and the plurality of cells at the second region;
        a data display control unit which causes to display the graphs indicating the measured results of the time domain waveforms at the first coordinate displayed by means of the coordinate generating unit; and
        a radio-communication marker generating unit which causes to display a predetermined number of radio-communication markers indicating points in radio-communication time which correspond to the radio-communication time information along the abscissa which is a time base of the second coordinate displayed by means of the coordinate generating unit;
    wherein the reception measurement unit has a function of measuring a transition time that, in accordance with a response signal from the mobile communication terminal, until it is switched from a state in which the mobile communication terminal receives a first test signal showing a greater strength at a current point in time among the plurality of test signals to a state in which the mobile communication terminal receives a second test signal having a second greater strength among the plurality of test signals accompanying that the plurality of test signals are varied to be successively made to be a greater strength in accordance with the scheduled time passage,
    wherein the test system further comprises a determining unit which, upon receiving the measured results of the transition time from the reception measurement unit, carries out success/failure determination as to whether a transition has been a success or a failure in which the mobile communication terminal switches from a state of receiving the first test signal to a state of receiving the second test signal among the plurality of test signals corresponding to the plurality of cells in accordance with the control information from the test procedure control unit, and
    wherein the data display control unit causes to display an indication of a success/failure as a result of the success/ failure determination by the determining unit together with a corresponding radio-communication marker among the predetermined number of radio-communication markers displayed by means of the radio-communication marker generating unit.

2. The test system according to claim 1, wherein the radio-communication marker generating unit, as the predetermined number of radio-communication markers, between the mobile communication terminal and respective positions of the plurality of cells on the ordinate in the second coordinate, causes to display an indication of at least one of down radio-communication from the mobile communication terminal to one of the cells and up radio-communication from one of the cells to the mobile communication terminal, and an indication of the points in radio-communication time which correspond to the radio-communication time information along the abscissa which is a time base of the second coordinate.

3. The test system according to claim 1, wherein the data display control unit causes to display an indication of states from a start up to a time of responding at a point in time when a scheduled response is completed, accompanying a display of the corresponding radio-communication marker among the predetermined number of radio-communication markers displayed by means of the radio-communication marker generating unit, at least one of the first and second coordinates along the abscissa which is a time base of the first and second coordinates displayed by means of the coordinate generating unit.

4. The test system according to claim 1, wherein the message log acquiring unit comprises a storage unit which acquires and analyzes message information when the transmission/reception unit and the mobile communication terminal exchange the respective predetermined messages, thereby storing at least a part of or a text of the message information so as to be read, and
wherein the display control unit includes:
a designation marker generating unit which generates a designation marker that moves in accordance with a selective designation of an operator along the abscissa which is a time base of the second coordinate displayed by means of the coordinate generating unit, and causes to display at least one of the predetermined number of radio-communication markers displayed by means of the radio-communication marker generating unit; and
a message display control unit which, when a specific radio-communication marker among the predetermined number of radio-communication markers is designated by the designation marker displayed by means of the designation marker generating unit, reads out at least a part of or a text of message information corresponding to the specific radio-communication marker from the storage unit of the message acquiring unit and causes to display it on the display unit.

5. The test system according to claim 1, wherein the reception measurement unit includes a spectrum analyzer having a function of analyzing and measuring a response signal from the mobile communication terminal at a time domain.

6. The test system according to claim 1, wherein the test procedure control unit comprises a computer and a computer readable medium having stored thereon computer readable program code means for causing the computer to carry out a transition test for a connection state of the mobile communication terminal of the cellular system, and to output control information including time setting information in accordance with the computer readable program code means.

7. The test system according to claim 6, wherein the determining unit, the message log acquiring unit, and the display control unit are organized together with the test procedure control unit as operating units of the computer.

8. The test system according to claim 7, wherein the computer readable medium has stored thereon:
first computer readable program code means for causing the transmission/reception unit to generate a plurality of test signals including predetermined messages corresponding to a plurality of cells in the cellular system in accordance with the control information from the test procedure control unit, and to vary the plurality of test signals in accordance with a scheduled time passage to thereby transmit the signals to the mobile communication terminal and receive response signals including the predetermined messages from the mobile communication terminal;
second computer readable program code means for causing the reception measurement unit to measure time domain waveforms of the response signals including the predetermined messages from the mobile communication terminal;
third computer readable program code means for causing the message log acquiring unit to acquire and store messages and the radio-communication time information when the transmission/reception unit and the mobile communication terminal exchange the respective predetermined messages;
fourth computer readable program code means for causing the display unit to display measured results of the time domain waveforms from the reception measurement unit and the radio-communication time information from the message log acquiring unit; and
fifth computer readable program code means for causing the display control unit to carry out processing for receiving the measured results of the time domain waveforms from the reception measurement unit and the radio-communication time information from the message log acquiring unit, and to display graphs indicating the measured results of the time domain waveforms and a predetermined number of radio-communication markers indicating points in radio-communication time which correspond to the radio-communication time information by a graphic display capable of simultaneously comparing at both sides on the same time base on the display unit.

9. The test system according to claim 8, wherein the computer readable medium further has stored thereon:
sixth computer readable program code means for causing the coordinate generating unit to divide a display screen of the display unit into at least a first region and a second region, and to display a first coordinate where the abscissa is time and the ordinate is power level on the first region, and a second coordinate where the abscissa is a time base which is the same as the abscissa of the first coordinate and the ordinate is respective positions of the mobile communication terminal and the plurality of cells on the second region;
seventh computer readable program code means for causing the data display control unit to display the graphs indicating the measured results of the time domain waveforms at the first coordinate displayed by means of the coordinate generating unit; and
eighth computer readable program code means for causing the radio-communication marker generating unit to display the predetermined number of radio-communication markers indicating points in radio-communication time which correspond to the radio-communication time information along the abscissa which is a time base of the second coordinate displayed by means of the coordinate generating unit.

10. The test system according to claim 9, wherein the computer readable medium further has stored thereon:
ninth computer readable program code means for causing the radio-communication marker generating unit to display, as the predetermined number of radio-communication markers, between the respective positions of the mobile communication terminal and the plurality of cells at the second coordinate, an indication of at least one of down radio-communication from the mobile communication terminal to one of the cells and up radio-communication from one of the cells to the mobile communication terminal, and an indication of the points in radio-communication time which correspond to the radio-communication time information along the abscissa which is a time base of the second coordinate.

11. The test system according to claim 10, wherein the computer readable medium further has stored thereon:
tenth computer readable program code means for causing the reception measurement unit to, in accordance with a response signal from the mobile communication terminal, measure a transition time that until it is switched from a state in which the mobile communication terminal receives a first test signal showing a greater strength at a current point in time among the plurality of test signals to a state in which the mobile communication terminal receives a second test signal having a second greater strength among the plurality of test signals accompanying that the plurality of test signals are varied to be successively made to be a greater strength in accordance with the scheduled time passage;
eleventh computer readable program code means for causing a determining unit to, upon receiving the measured results of the transition time from the reception measurement unit, carry out success/failure determination as to whether a transition has been a success or a failure in which the mobile communication terminal is switched from a state of receiving the first test signal among the plurality of test signals corresponding to the plurality of cells to a state of receiving the second test signal in accordance with the control information from the test procedure control unit; and
twelfth computer readable program code means for causing the data display control unit to display an indication of a success/failure as a result of the success/failure determination by the determining unit together with a corresponding radio-communication marker among the predetermined number of radio-communication markers displayed by means of the radio-communication marker generating unit.

12. The test system according to claim 11, wherein the computer readable medium further has stored thereon:
thirteenth computer readable program code means for causing the data display control unit to display an indication of states from a start up to a time of responding at a point in time when a scheduled response is completed, accompanying the display of a corresponding radio-communication marker among the predetermined number of radio-communication markers displayed by means of the radio-communication marker generating unit, at least one of the first and second coordinates along the abscissa which is a time base of the first and second coordinates displayed by means of the coordinate generating unit.

13. The test system according to claim 12, wherein the computer readable medium further has stored thereon:
fourteenth computer readable program code means for causing the storage unit of the message log acquiring unit to acquire and analyze message information when the transmission/reception unit and the mobile communication terminal exchange the respective predetermined messages, thereby storing at least a part of or a text of the message information to be read.

14. The test system according to claim 13, wherein the computer readable medium further has stored thereon:
fifteenth computer readable program code means for causing the designation marker generating unit of the display control unit to move in accordance with a selective designation by an operator along the abscissa which is a time base of the second coordinate displayed by means of the coordinate generating unit, and generate a designation marker identifying at least one of the predetermined number of radio-communication markers displayed by means of the radio-communication marker generating unit to be designated; and
sixteenth computer readable program code means for causing the message display control unit of the display control unit to, when a specific radio-communication marker among the predetermined number of radio-communication markers is designated by the designation marker displayed by means of the designation marker generating unit, read out at least a part of or a text of the message information corresponding to the specific radio-communication marker from the message acquiring unit, and to display it on the display unit.

15. A test method for a mobile communication terminal comprising:
operating a test procedure control unit to execute a procedure for carrying out a transition test for a connection state of a mobile communication terminal of a cellular system, and outputting control information including time setting information in accordance with the procedure from the test procedure control unit;
operating a transmission/reception unit, in accordance with the control information from the test procedure control unit, to generate a plurality of test signals including predetermined messages corresponding to a plurality of cells in the cellular system, and vary the plurality of test signals in accordance with a scheduled time passage to thereby transmit the signals to the mobile communication terminal and receive a response signal including a predetermined message from the mobile communication terminal in the transmission/reception unit;
operating a reception measurement unit to measure a time domain waveform of the response signal including the predetermined message from the mobile communication terminal in the reception measurement unit;
operating a message log acquiring unit to acquire and store messages and radio-communication time information when the transmission/reception unit and the mobile communication terminal exchange respective messages by means of the message log acquiring unit;
operating a display unit to display measured results of the time domain waveforms from the reception measurement unit, and the radio-communication time information from the message log acquiring unit; and
operating a display control unit to carry out processing for receiving the measured results of the time domain waveforms from the reception measurement unit and the radio-communication time information from the message log acquiring unit, and for causing to display graphs indicating the measured results of the time domain waveforms and a predetermined number of radio-communication markers indicating points in radio-communication time which correspond to the radio-communication time information by a graphic display capable of simultaneously comparing at both sides of the same time base on the display unit by means of the display control unit;

wherein the test procedure control unit comprises a computer and a computer readable medium having stored thereon a computer readable program code means for causing the computer to carry out a transition test for a connection state of the mobile communication terminal of the cellular system, and to output control information including time setting information in accordance with the computer readable program code means;

wherein the message log acquiring unit and the display control unit are organized together with the test procedure control unit as operating units of the computer; and wherein the computer readable medium has stored thereon:

first computer readable program code means for causing the transmission/reception unit to, in accordance with the control information from the test procedure control unit, generate a plurality of test signals including predetermined messages corresponding to the plurality of cells in the cellular system, and vary the plurality of test signals in accordance with a scheduled time passage to thereby transmit the signals to the mobile communication terminal and receive response signals including the predetermined messages from the mobile communication terminal;

second computer readable program code means for causing the reception measurement unit to measure time domain waveforms of the response signals including the predetermined messages from the mobile communication terminal;

third computer readable program code means for causing the message log acquiring unit to acquire and store messages and radio-communication time information when the transmission/reception unit and the mobile communication terminal exchange the respective predetermined messages;

fourth computer readable program code means for causing the display unit to display measured results of the time domain waveforms from the reception measurement unit and the radio-communication time information from the message log acquiring unit;

fifth computer readable program code means for causing the display control unit to carry out processing for receiving the measured results of the time domain waveforms from the reception measurement unit and the radio-communication time information from the message log acquiring unit, and for causing to display graphs indicating the measured results of the time domain waveforms and a predetermined number of radio-communication markers indicating points in radio-communication time which correspond to the radio-communication time information by a graphic display capable of simultaneously comparing at both sides on the same time base on the display unit;

sixth computer readable program code means for causing a coordinate generating unit of the display control unit to divide a display screen of the display unit into at least a first region and a second region, and to display a first coordinate where the abscissa is time and the ordinate is power level on the first region, and a second coordinate where the abscissa is a time base which is the same as the abscissa of the first coordinate and the ordinate is respective positions of the mobile communication terminal and the plurality of cells on the second region;

seventh computer readable program code means for causing a data display control unit of the display control unit to display graphs indicating the measured results of the time domain waveforms at the first coordinate displayed by means of the coordinate generating unit;

eighth computer readable program code means for causing a radio-communication marker generating unit of the display control unit to display a predetermined number of radio-communication markers indicating points in radio-communication time which correspond to the radio-communication time information along the abscissa which is a time base of the second coordinate displayed by means of the coordinate generating unit;

ninth computer readable program code means for causing the radio-communication marker generating unit of the display control unit to display an indication of, as the predetermined number of radio-communication markers, between the respective positions of the mobile communication terminal and the plurality of cells on the ordinate at the second coordinate, at least one of down radio-communication from the mobile communication terminal to one of the cells and up radio-communication from one of the cells to the mobile communication terminal, and an indication of the points in radio-communication time which correspond to the radio-communication time information along the abscissa which is a time base of the second coordinate;

tenth computer readable program code means for causing the reception measurement unit to, in accordance with the response signals from the mobile communication terminal, measure a transition time that until it is switched from a state in which the mobile communication terminal receives a first test signal showing a greater strength at a current point in time among the plurality of test signals to a state in which the mobile communication terminal receives a second test signal having a second greater strength among the plurality of test signals accompanying that the plurality of test signals are varied to be successively made to be a greater strength in accordance with the scheduled time passage;

eleventh computer readable program code means for causing the determining unit to, upon receiving the measured results of the transition time from the reception measurement unit, carry out success/failure determination as to whether a transition has been a success or a failure in which the mobile communication terminal is switched from a state of receiving the first test signal among the plurality of test signals corresponding to the plurality of cells to a state of receiving the second test signal in accordance with the control information from the test procedure control unit; and twelfth computer readable program code means for causing the data display control unit of the display control unit to display an indication of a success/failure as the result of the success/failure determination by the determining unit together with a corresponding radio-communication marker among the predetermined number of radio-communication markers displayed by means of the radio-communication marker generating unit.

16. The test method according to claim 15, wherein the computer readable medium further has stored thereon:

thirteenth computer readable program code means for causing the data display control unit to display an indication of states from a start up to a time of responding at a point in time when a scheduled response is completed, accompanying the display of a corresponding radio-communication marker among the predetermined number of radio-communication markers displayed by means of the radio-communication marker generating unit, at least one of the first and second coordinates along the abscissa which is a time base of the first and second coordinates displayed by means of the coordinate generating unit.

17. The test method according to claim 16, wherein the computer readable medium further has stored thereon:

fourteenth computer readable program code means for causing the storage unit of the message log acquiring unit to acquire and analyze message information when the transmission/reception unit and the mobile communication terminal exchange the respective predetermined messages, thereby storing at least a part of or a text of the message information to be read.

18. The test method according to claim 17, wherein the computer readable medium further has stored thereon:

fifteenth computer readable program code means for causing the designation marker generating unit of the display control unit to move in accordance with a selective designation by an operator along the abscissa which is a time base of the second coordinate displayed by means of the coordinate generating unit, and to generate a designation marker identifying at least one of the predetermined number of radio-communication markers displayed by means of the radio-communication marker generating unit to be designated; and sixteenth computer readable program code means for causing the message display control unit of the display control unit to, when a specific radio-communication marker among the predetermined number of radio-communication markers is designated by the designation marker displayed by the designation marker generating unit, read out at least a part of or a text of the message information corresponding to the specific radio-communication marker from the message acquiring unit, and to display it on the display unit.

* * * * *